Nov. 8, 1966   A. J. PIPPERT   3,284,088
COMPOSITE NONADJUSTABLE SEAL ASSEMBLY
Filed July 24, 1963   2 Sheets-Sheet 1

Aaron J. Pippert
INVENTOR.

BY Browning, Simms,
Hyer & Eickenroht
ATTORNEYS

Nov. 8, 1966  A. J. PIPPERT  3,284,088
COMPOSITE NONADJUSTABLE SEAL ASSEMBLY

Filed July 24, 1963  2 Sheets-Sheet 2

Aaron J. Pippert
INVENTOR.

BY Browning, Simms,
Hyer & Eickenroht.
ATTORNEYS

United States Patent Office 3,284,088
Patented Nov. 8, 1966

3,284,088
COMPOSITE NONADJUSTABLE SEAL ASSEMBLY
Aaron J. Pippert, Houston, Tex., assignor to Universal Packing & Gasket Company, Houston, Tex., a corporation of Texas
Filed July 24, 1963, Ser. No. 297,388
7 Claims. (Cl. 277—124)

This invention relates to a seal ring assembly for providing a seal in locations comparable to that in a stuffing box and around a rod or plunger, although it is applicable also to a reverse situation in which it would be carried in a recess in a rod or plunger and made to slide within a cylinder.

In seals for use around rods and the like a seal ring assembly is required to provide a seal against a moving surface, as, for example, about its inner periphery against a rod, and to provide along its other or outer periphery a static seal as against the inside of a stuffing box. The moving seal is required to be constantly forced into sealing engagement with the moving surface it seals against but that force must be limited to avoid excessive friction which would cause excessive loss of power and damage to both the moving seal and the surface it seals against.

The initial sealing force against a moving seal may be provided by initial distortion of an elastic member which may be the material of the seal itself or a separate member acting as an energizer. The initial distortion may be provided by the tightening resulting from insertion of the rod or other moving member or by the axial compression resulting from axial tightening of the gland of the stuffing box containing the seal. An energizer separate from the seal is preferable so they may be of different materials, each appropriate to its function. Also initial distortion by axial tightening is desirable as it may be made of as great extent as desirable, but must be limited by care or otherwise to prevent excessive distortion.

The static seal may be made of smaller cross section and forced more tightly into initial engagement but requires accurate placement and positive positioning to which its small cross section is not well adapted. It is also necessary that both seals be replaced from time to time and it is therefore desirable that neither of them be integrally joined to other and more expensive parts of the assembly, which have a much longer life.

It is an object of this invention to provide a seal ring assembly in which the seal against a moving surface will be constantly provided by a given resilient force principally applied by the tightening or compression of the seal assembly but in which such tightening or compression may be fully applied when the seal assembly is installed and thereafter will require no adjustment.

It is a further object of this invention to provide such a seal ring assembly with means providing a static seal radially opposite from the moving seal, the static seal also being effectively applied by the tightening of the seal assembly in place when it is initially installed.

Another object is to provide a seal ring assembly in which the endwise tightening of the assembly when it is installed would be limited by substantially rigid support elements extending from end to end of the seal assembly and in which a seal is provided between the various elements of the assembly.

Another object is to provide an inexpensive means integral with the static seal for assisting the accurate placement and positive positioning of the static seal and which may also form part of a means for limiting the endwise tightening of the assembly.

Another object is to provide an inexpensive means integrally carrying both seals to facilitate their handling, placement, replacement, and retention in proper position relative to one another and the rest of the assembly and which may also form part of a means for limiting the endwise tightening of the assembly.

Other objects and advantages of this invention will become apparent from the following description taken in connection with the accompanying drawings wherein are illustrated by way of example two embodiments of the invention.

In the drawings:
FIG. 1 is a longitudinal cross-sectional view through a stuffing box containing in operative position a number of seal ring assemblies constructed in accordance with this invention, said assemblies being illustrated in axial cross section.

Figure 1:
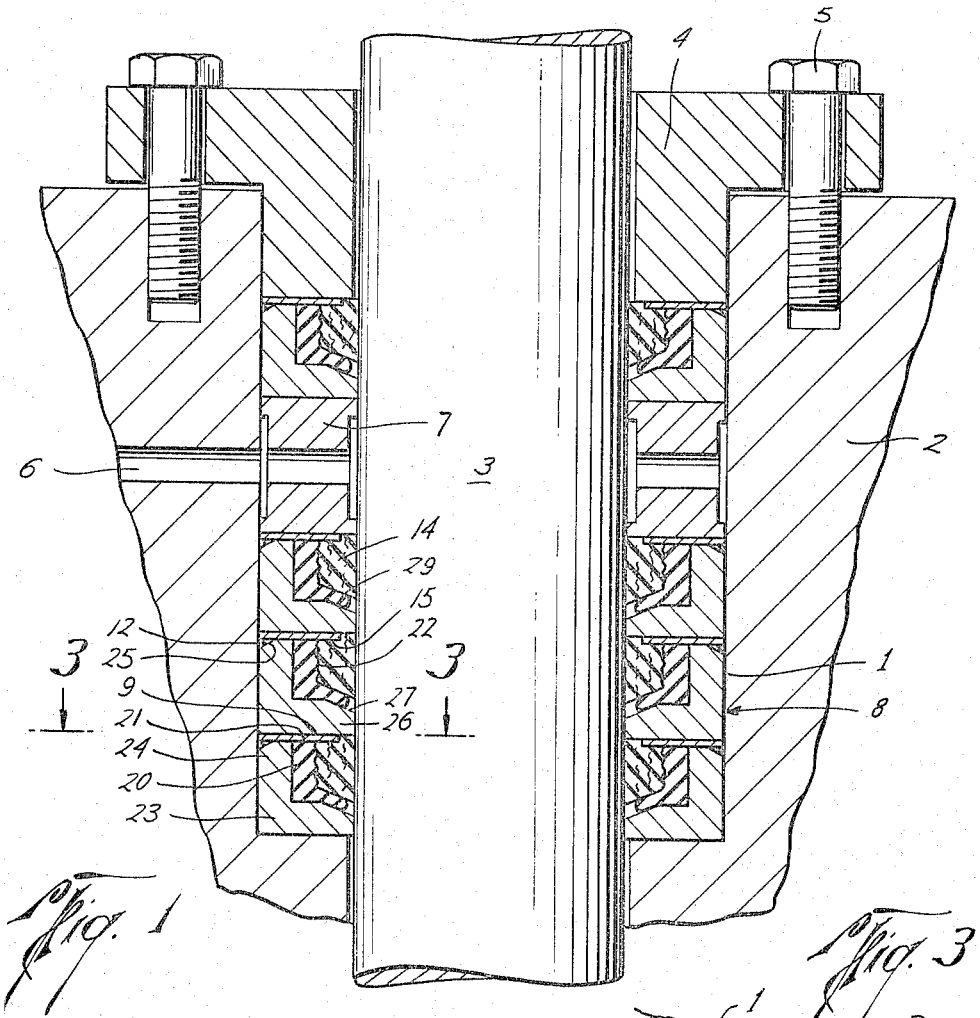

In the forms illustrated in the drawings the objects of this invention are accomplished by an assembly of a plurality of annular elements comprising a radially extending base member, inner and outer seal bodies for sealing respectively against an inner shaft or plunger and an outer stuffing box or cylinder, one of which seals will be static and the other moving, a seal energizer for the moving seal in the form of a body of elastomer adapted to be distorted to apply resilient sealing force to the moving seal, and an expander performing the dual role of expanding the respective seals into seal position and of providing a rigid support between the two axial extremities of the seal assembly to prevent the flexible seals from being damaged by excessive compression.

The base is of some suitable relatively hard unyielding material under compression which serves to tie together and appropriately dispose relative to each other and each to the remainder of the assembly the two seals and the seal energizer, preferably by being bonded or otherwise secured directly or indirectly thereto. The base is also preferably coated with a thin coating of some seal material which may be the same deformable seal material as employed in the respective inner and outer seals, which coating serves the dual purpose of providing a better bond between the base member and the inner and outer seals and energizer and of providing a seal against abutting metal parts such as the end wall of a stuffing box, the end of a gland, or the seal expander of an adjacent assembly. However, this coating should be so thin as to provide under extreme axial pressure from tightening of the stuffing box, no significant change in the axial dimension of the coating and base combined. The base may be of mesh or reticulated construction to permit a better bond with the sealing material which coats it. Thus, the base not only assists in positioning and retaining each seal and relating them to each other, but it forms a part of the compression limiting rigid support means, yet is itself inexpensive and separate from the more expensive parts of said means.

The expander in the illustrations in the drawings directly engages the static seal body to cause it to move radially beyond the base member and establish the static seal with a stuffing box or the like and directly engages the body of elastomer forming the energizer to deform it toward the moving seal and cause it to resiliently urge the moving seal radially beyond the base to provide sealing engagement. This expander additionally performs the supporting function limiting the degree of longitudinal compression of the seal assembly by directly engaging one face of the base of the seal assembly of which it is a part and the opposite face of the base of an adjacent seal assembly or of the end of a stuffing box or gland in which the seal assemblies are employed. It is so sized that when fully assembled into engagement with the base of the seal assembly it will cooperate with the base and the moving seal body to partly confine the elastomer body of the energizer and deform it so that thereafter the energizer will act continuously with a resilient force against the moving seal body urging it toward sealing position. However, the parts are so sized that the energizer will not be completely confined and will not be forced into engagement with a shaft or the like extending through the assembly even when the assembly is under maximum compression.

With more specific reference to the drawings, the seal assembly is adapted to be employed with other similar seal assemblies in various ways, as, for example, in a stuffing box 1 formed in a body 2 for providing a seal around a shaft or plunger 3. The assembly or assemblies in the stuffing box are adapted to be confined and initially compressed longitudinally or axially by means of a gland 4 secured in place by cap screws 5 or the like. The stuffing box may have a tattle-tale bleed opening 6 for the detection of small leaks in a conventional manner and for this purpose may employ what is known as a lantern ring 7 on the low pressure side of most of the seal ring assemblies. One or more of the seal assemblies may if desired be located on the low pressure side of the lantern ring 7.

With more specific reference to FIG. 1, the seal ring assemblies illustrated are indicated by the numeral 8. Each is made up of a base 9 of some suitable hard material substantially unyieldable under compression, particularly in an axial direction. A suitable material for this purpose is a thin sheet of metal or the like which may be of the expanded metal type well known for various construction purposes, having openings 10 therein.

Molded over the expanded metal base element 9 and through the openings 10 is a body of elastomer such as rubber or any of the suitable well known synthetic elastomers whose characteristics are not incompatible with the use to which the specific seal assembly is to be put. This elastomer body 11 is molded through the openings 10 and forms a thin coating over the outside of the metal base 9. Preferably this coating is so thin that it will not provide any significant yielding in an axial direction under compression but will merely serve as a sealing material to seal against adjacent uncoated metal parts.

Figure 2:
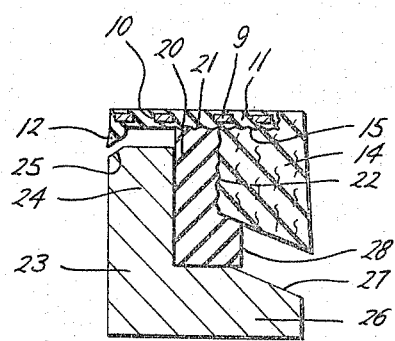
FIG. 2 is an enlarged cross section through one side of a seal ring assembly as shown in FIG. 1 but prior to the axial compression thereof which is accomplished when the same is installed in a stuffing box.

A static seal body 12 is carried on one radial edge of the base 9 and a moving seal body 14 on the opposite edge. In the instance illustrated the static seal body is on the outside so as to engage and form a static seal with the inner wall of a stuffing box such as the stuffing box 1 while the moving seal body 14 is carried along the inner edge of the base. Preferably both are integrally joined to the base either by suitable adhesive or by bonding in any well known fashion. The body 12 is shown in FIG. 2 as being integral with the elastomer coating 11 on the base and as providing a lip extending axially from the base while the body 14 is shown as being of a different kind of material from the elastomer 11 coating the base but bonded thereto along the line 15. It likewise extends in an axial direction from the base and in the case shown in FIG. 2 both of these seal bodies extend in the same axial direction from the base, although this is not essential as will presently be disclosed.

The seal bodies 12 and 14 may, of course, be made of any suitable material depending upon the pressures, temperatures and the like to which they are to be exposed and it is contemplated that they may be either entirely of an elastomer or of an elastomer impregnation of fabric or other material of more or less conventional nature suitable for such types of seals.

Backing up the moving seal 14 is an annular body 20 of an elastomer providing an energizer for this moving seal. This elastomer should be of a character which will flow under pressure but of sufficient resiliency so that upon being distorted by being made to flow under pressure it will constantly exert a resilient force tending to return it to its original shape. Hence, if distorted while having a portion of its surface bearing against the moving seal 14 it will, as long as so distorted, urge this moving seal with a resilient force in a direction tending to move it into sealing position against a rod or plunger 3 or other surface against which a moving seal is desired. This energizer is shown as being bonded at 21 to the paper-thin coating material 11 of the base 9 and at 22 to the material of the seal 14. This specific arrangement is variable as will be illustrated by a description of another modification shown in FIGS. 4, 5 and 6 of the drawings, but it is highly desirable that both of the seal bodies 12 and 14 and the energizer 20 be carried directly or indirectly by being joined to the base 9 so that the base will keep them in proper disposition relative to each other.

The expander 23 in FIGS. 1 and 2 is in the form of an annular member of L-shaped cross section having one leg 24 extending axially and intended in use to have its end surface in load bearing engagement with the elastomer coated surface of the base 9 as clearly illustrated in FIG. 1. When in this position, this expander 23 will clearly serve to prevent further longitudinal or axial compression of the ring assembly by providing a rigid support between the base 9 and either a base of an adjacent seal ring assembly of the same character or of the end of a stuffing box or gland, all as illustrated in FIG. 1.

The outermost corner of the leg 24 of the expander 23 is beveled at 25 to engage the static seal body 12 upon being fully assembled and force this body radially beyond the base 9 into sealing engagement with the wall of a stuffing box or the like in which it may be employed.

The other leg of the L-shaped expander 23 extends radially and in the form illustrated, extends over that end of the energizer 20 which is opposite from the base 9. On reference to FIG. 1 it will be seen that when fully assembled with the other parts the expander 23 cooperates with the base 9 and the moving seal 14 to confine the energizer 20 except for a small opening between the seal 14 and the radial leg 26 of the expander. This opening is left between the beveled surface 27 on the leg 26 of the expander and the opposed inclined surface of the moving seal element 14. Into this space the portion 28 of the energizer, which is left unconfined by the parts mentioned, will be caused to flow as shown at 29 in FIG. 1. It should be of insufficient volume to engage the rod or plunger 3, even when the assembly is fully compressed. By its nature this distortion produces an internal resilient stress in the body of the energizer tending to cause it to return to its initial shape. Inasmuch as the expander 23 is of a material that is hard and unyieldable under compression, this tendency of the material of the energizer 20 to return to its initial cross-sectional shape will serve to exert a constant force resilient in nature against the inner portion of the moving seal 14 tending to urge it in a radial direction beyond the base 9 and into sealing position against a moving element such as the rod or plunger 3.

Thus both of the annular flexible bodies forming the static seal 12 and the moving seal 14 have parts that are deflectable radially beyond the base in opposite directions to form static and moving seals respectively, and this deflection in each case is provided by the expander 23 being forced into fully engaged position with the base 9 as shown in FIG. 1. The expander acts directly upon the static seal 12 to force it radially into seal position and indirectly upon the moving seal 14 by causing a distortion of the annular elastomer energizer 20.

Figure 3:
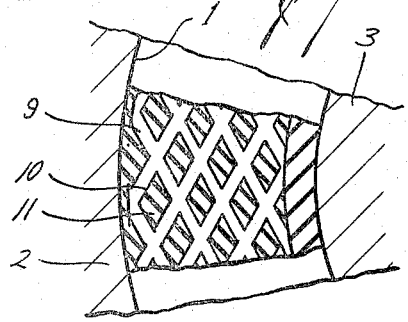
FIG. 3 is a fragmentary cross section along a plane transverse to the axis and just beneath the outer skin or surface of a seal ring assembly showing the nature of the base member forming a part thereof.
Figure 4:
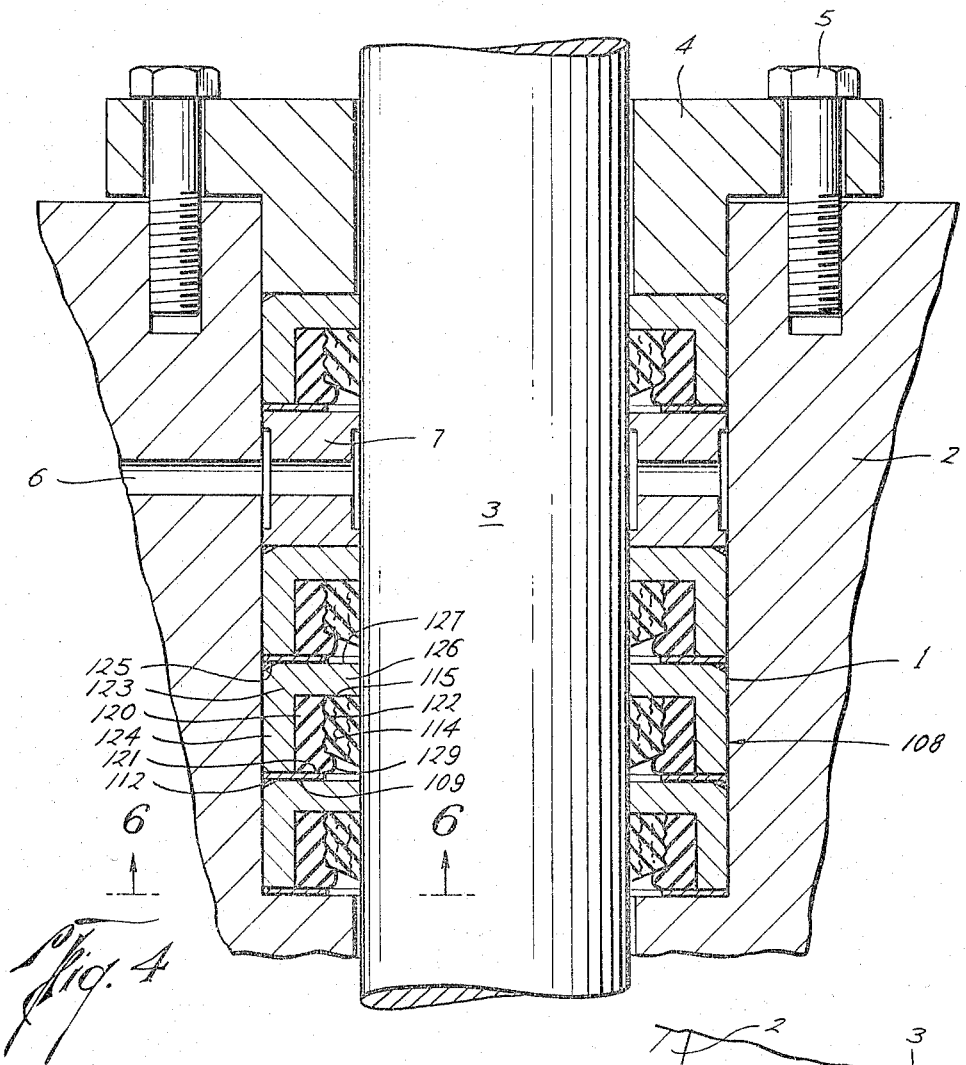
FIG. 4 is a view similar to FIG. 1 but illustrating in place in a stuffing box a modified form of seal ring assembly constructed in accordance with this invention.
Figure 5:
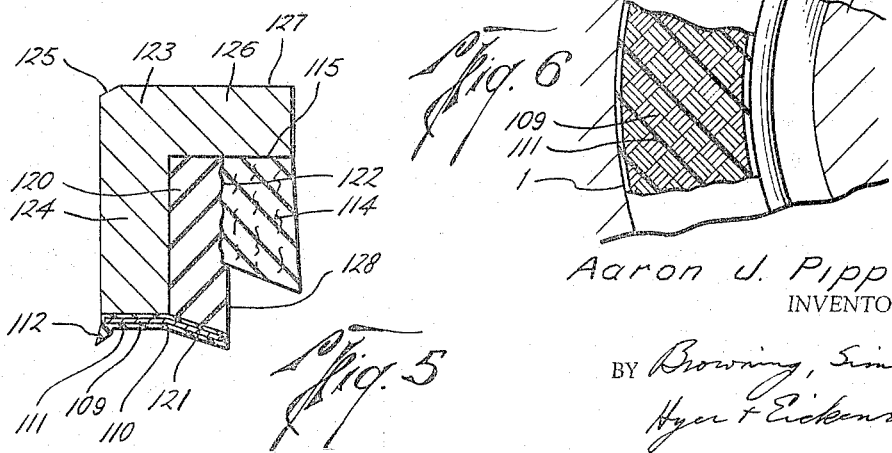
FIG. 5 is a view similar to FIG. 2 but showing the modified form of the invention illustrated in FIG. 4.
Figure 6:
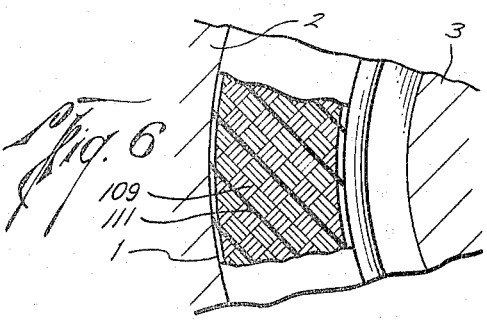
FIG. 6 is a view similar to FIG. 3 but illustrating a modified construction of base member forming a part of the assembly.

Referring now to the modification shown in FIGS. 4, 5 and 6, it will be seen that the base, 109, instead of being of flat material as in FIG. 3, is formed with an angle at 110 so that it has in effect two annular parts, the outer of which is in a substantially radial plane transverse to the axis and the inner of which is on a conical surface. This base, as in the previously described form, is provided with a suitable paper-thin elastomer coating 111, and may be of reticulated form of any suitable nature such as, for example, a metal mesh as indicated in FIG. 6.

In this instance the static seal is provided by a small lip-shaped annular body which, as in the previously described form, is of flexible seal material, is carried on the base, and has a part deflectable radially beyond the base to provide a static seal.

In this instance the moving seal body 114 is located on the opposite side of the base 109 from the static seal body 112, and is not joined directly to the base 109 but is provided along its endwise surface 115 with a shape adapted to receive the seal expander as will presently appear. The flexible moving seal element 114, however, may be joined to the base 109 through the intermediary of the seal energizer 120 which is secured to the conically disposed portion of the base 109 by being bonded or otherwise joined thereto along the line 121, and is bonded or otherwise joined along the line 122 to the moving seal element 114.

The seal expander 123 is of L-shaped cross section similar to that in FIGS. 1 to 3 and has a longitudinally extending leg 124 adapted to bear against the base 109 to support the seal assembly against excessive compression in an axial direction as in the other form. However, this leg 124 of the expander 123 does not directly engage the static seal body 112 because of the fact that that body is located on the opposite side of the base 109 from the engagement of the leg 124 with the base. Instead, expander 123 is provided with a beveled corner at the point where its two legs join as shown at 125 so that it will, when brought into engagement with an adjacent seal assembly of the same character, engage the static seal body 112 of such adjacent assembly and expand it radially beyond the base 109 into static sealing engagement with the wall of a stuffing box or the like surrounding the same. This expander has a second leg 126 extending radially over the end surfaces of the energizer 120 and the moving seal body 114 so as to provide axial support for both of these elements and so as to cooperate with the moving seal element 114 and the base 109 to partially confine the energizer 120 in much the same manner as in the previous description. However, the relative movement of the expander 123 toward the base to distort the energizer 120 in this form of the invention requires the flattening of the base 109 until it all occupies substantially a radial plane as illustrated in FIG. 4. The expander 123 still serves to provide the distorting force which produces the distortion of the energizer 120 and causes its portion 128 to flow as indicated at 129. The result is a resilient constant expanding force on the moving seal 114 urging it into sealing position, while the expander 123 serves to prevent additional or excessive compression of the seal assembly.

In the form of the invention shown in FIGS. 4, 5 and 6 it is illustrated that the static seal body 112 may, in the case of assemblies located at the end of the stuffing box or adjacent another element such as the lantern ring 7 be made much smaller or eliminated, in the latter case the portion of the coating material around the radial extremity of the metal base serving as the static seal body.

It will readily be seen that with the assemblies described, one or more of such assemblies may be employed in a stuffing box or the like and initially clamped or compressed in place by any suitable element such as an ordinary gland without danger of excessive axial compression of the assembly so as to damage it and without necessity for any particular skill in putting it in place and assembling it. It is contemplated that the initial tightening will bring incompressible parts of the assembly or assemblies into solid engagement with one another from end to end of the stuffing box, forming a solid stop against further tightening. At the same time the initial securing of the assembly in place by full tightening of the gland or the like will directly result in the provision of a static seal between the assembly and the stuffing box or other surface within which it is carried and with which a static seal is necessary and this static seal will not be disturbed during the useful life of the assembly. By the same operation of the full tightening of the assembly in place a suitable yieldable resilient force will be applied to the moving seal urging it against the part with which it is to provide a constant moving seal, and this resilient force will be maintained throughout the useful life of the assembly without necessity or even possibility for any additional adjustment whatsoever.

It will be appreciated also that while the illustrations show ring assemblies utilized in cases where the outermost seal is the static seal and the innermost the moving seal, this invention is usable under reverse circumstances by a simple reversal of parts.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A composite seal assembly comprising an annular base of hard material unyieldable under compression in an axial direction, a seal means including an annular flexible body carried by and extending axially from said base and having a part deflectable radially beyond said base in one radial direction, an annular axial spacer and support member separate from said base and seal means of material hard and unyieldable under compression having a part extending axially and engaging said base and providing a rigid support between one face of said base and a remote end of the assembly, said seal means being a moving seal means and said assembly including also a moving seal energizer with an annular body of elastomer in force transmitting relation to the deflectable part of said moving seal so that when distorted it will apply a resilient pressure to said part in a direction to deflect it radially beyond said base and said spacer and support member has a second part positioned to cooperate with said base and moving seal to partly confine the energizer and distort the same, said energizer being of insufficient volume to completely fill the space available to it between said base, said moving seal means and said spacer and support member when said spacer and support member is in engagement with said base.

2. A composite seal assembly as set forth in claim 1 in which said moving seal is spaced from said base and said energizer is interposed therebetween and joined to both said moving seal and said base.

3. A composite seal assembly comprising an annular base of hard material unyieldable under compression in an axial direction, a static seal means including an annular flexible body carried by said base and having a part deflectable radially beyond said base, a moving seal means including an annular flexible body carried by and extending axially from said base and having a part deflectable radially beyond said base in the opposite direction from said static seal, a moving seal energizer including an annular body of elastomer in force-transmitting relation to the deflectable part of said moving seal so that when distorted it will apply a resilient pressure to said part in a direction to deflect it radially beyond said base, and an annular seal expander of material hard and unyieldable under compression having a first part extending axially and engaging said base between said seals and providing a rigid support between one face of said base and a remote end of the assembly, a second part engaging and deflecting said static seal radially when said first part is in engagement with said base, and a third part positioned to cooperate with said base and moving seal to incompletely confine the energizer and distort the same.

4. A composite seal assembly as set forth in claim 3 in which said static seal and said energizer are bonded to said base and said moving seal is bonded to said energizer.

5. A composite seal assembly as set forth in claim 3 in which said seals are both bonded to said base and said moving seal is bonded to said energizer.

6. A composite seal assembly as set forth in claim 3 in which said static seal body extends axially from said base.

7. A composite seal assembly as set forth in claim 3 in which said static seal extends axially from said base in one direction and said moving seal extends from said base in the opposite axial direction.

References Cited by the Examiner
UNITED STATES PATENTS

| | | | |
|---|---|---|---|
| 2,106,293 | 1/1938 | Christenson | 277—124 |
| 3,120,960 | 2/1964 | Pippert et al. | 277—125 X |

FOREIGN PATENTS 505,024  5/1939  Great Britain.

SAMUEL ROTHBERG, *Primary Examiner.*